(No Model.)

S. HAMBLIN.
FILE CUTTING MACHINE.

No. 309,458. Patented Dec. 16, 1884.

Witnesses:
Daniel E Damon
Stephen M Hamblin

Inventor:
Silvanus Hamblin

UNITED STATES PATENT OFFICE.

SILVANUS HAMBLIN, OF PLYMOUTH, MASSACHUSETTS, ASSIGNOR TO THE STANDARD FILE COMPANY, OF SAME PLACE.

FILE-CUTTING MACHINE.

SPECIFICATION forming part of Letters Patent No. 309,458, dated December 16, 1884.

Application filed November 16, 1883. (No model.)

*To all whom it may concern:*

Be it known that I, SILVANUS HAMBLIN, a citizen of the United States, residing at Plymouth, in the county of Plymouth, in the State of Massachusetts, have invented a new and useful File-Cutting Machine, of which the following is a specification.

My invention relates to improvements in file-cutting machines in which diagonal cams operate in conjunction with a diagonal gear; and the objects of my invention and improvement are, first, to provide an intermittent motion of the slide holding the file-blank; second, to afford facilities for the proper adjustment of the movement of the slide; and, third, to hold the file-blank motionless and firmly in place at the exact point of time when it receives the blow of the chisel or cutter. I attain these objects by the mechanism illustrated in the accompanying drawings, in which—

Figure 1:
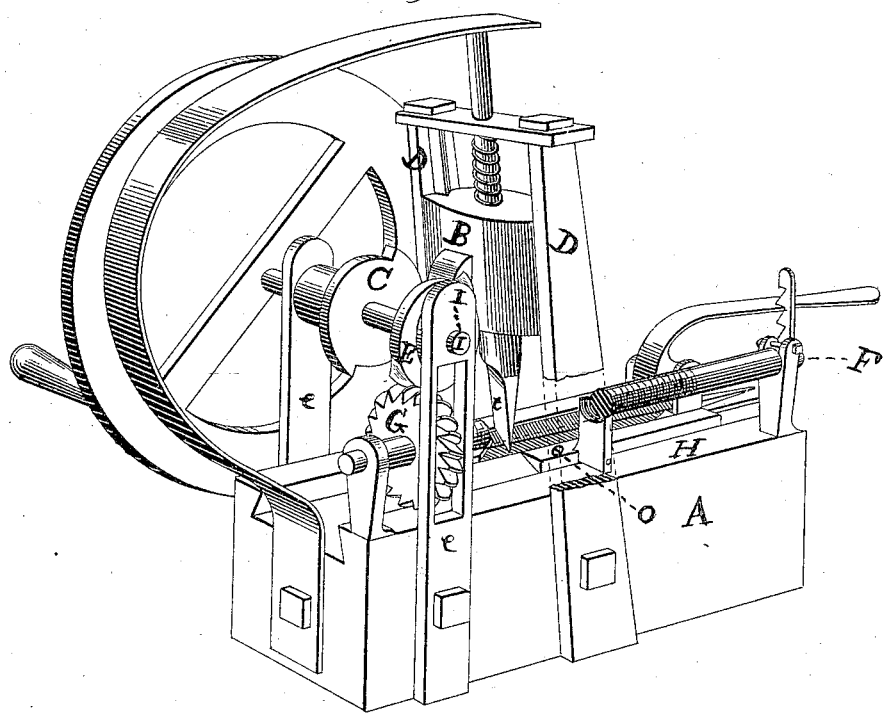
Figure 2:
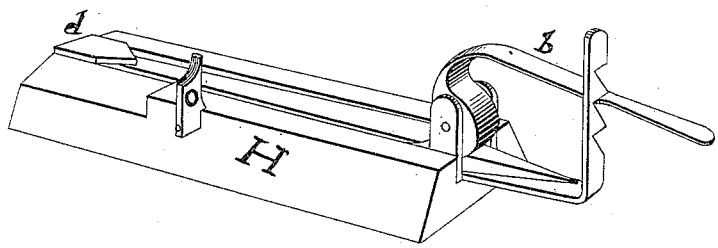

Figure 1 is a perspective view of the entire machine as it appears after the removal of the column, and Fig. 2 a view of the slide for holding the file-blank.

Similar letters refer to similar parts in both views.

A is a bed or block, forming a solid foundation for supporting the operating mechanism. e e are standards for supporting the shaft I. This shaft has a diagonal cam, E, fastened upon it, matching into the diagonal gear G, fastened upon screw F, the latter matching into the half-nut O, secured to the slide H. The latter is for holding the file-blank, which is secured in the slide by springs $d$ and $b$, as shown in Fig. 2. The shaft I can be turned by hand or power, as desired. When the shaft is turned, the diagonal cam E is caused to revolve, and during its progress it intersects with diagonal gear G, causing the gear fastened to the screw F to turn the screw, and the screw being matched into the half-nut O, fastened to the slide H, the slide is caused to move in unison with the other parts, the movement of the slide being graduated by the number of teeth upon the gear G.

D D are columns for holding and guiding the hammer B. Upon the shaft I is fastened a cam, C, for raising the hammer B, (the latter holding the chisel or cutter,) the cam C being at a right angle with cam E. The file-blank, secured in slide H, is moved at intervals between the blows of the cutter $t$, and by the operation of the cam E and gear G the file-blank is perfectly stationary while receiving the blow of the cutter $t$, and while the cutter is raised for the next blow the blank moves forward (as described above) for the next tooth to be cut. By this movement between the blows, and by being held stationary to receive the blow, a better tooth is formed than where the feed or movement of the blank is continuous, the tooth thus formed by this machine being superior to that cut by any other method, hand or otherwise.

What I claim as my invention, and desire to secure by Letters Patent, is—

The herein-described combination of mechanism, consisting of diagonal cam E, diagonal gear G, with screw F, and nut O, fitted to slide H, all substantially as set forth, which is exactly adapted to attain the objects sought.

SILVANUS HAMBLIN.

Witnesses:
 S. M. HAMBLIN,
 HENRY E. SWIFT.